March 4, 1930.  F. C. GOLDSMITH  1,749,027
ATTACHMENT FOR MOTOR VEHICLES
Filed May 10, 1928  2 Sheets-Sheet 1
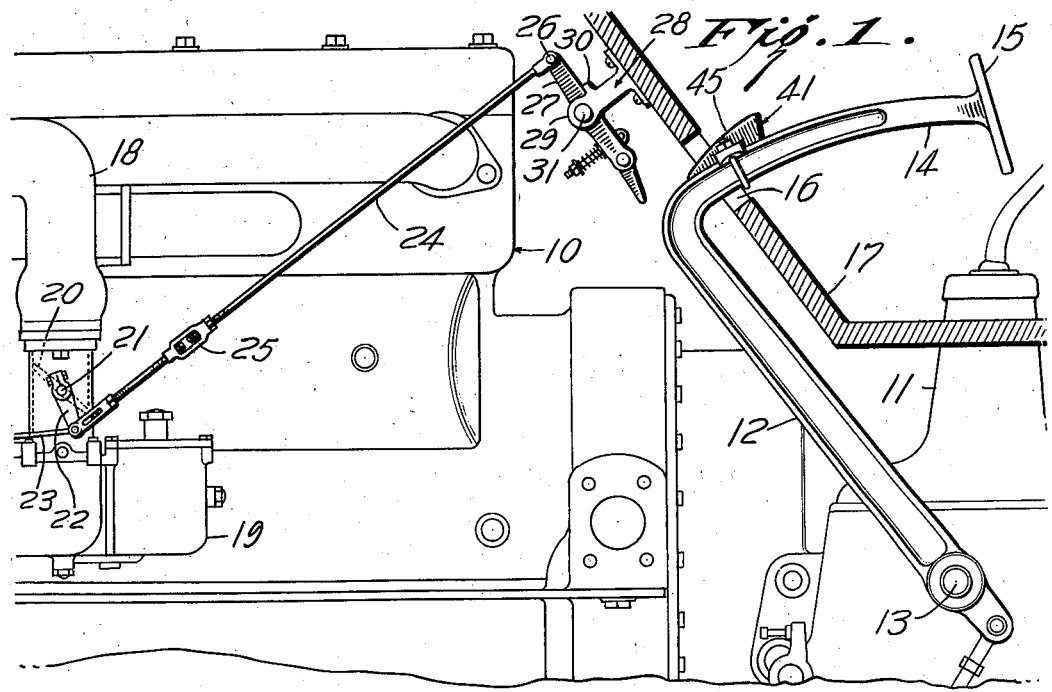
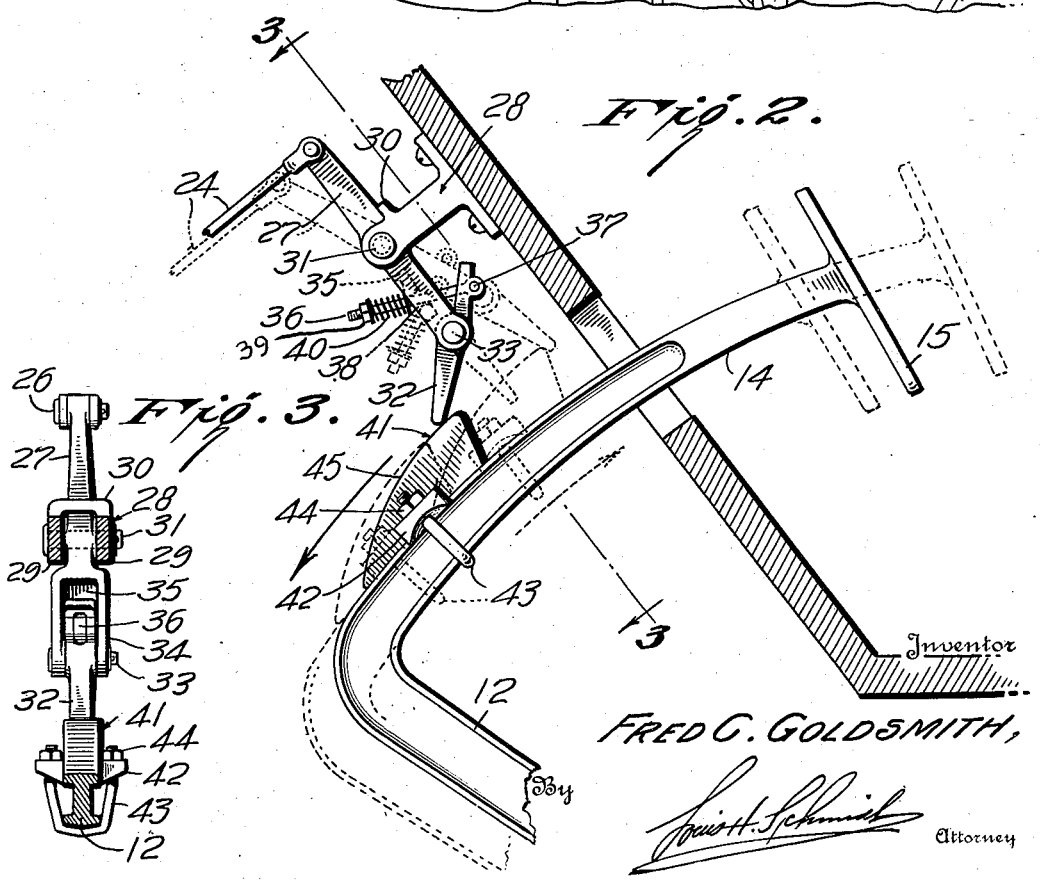
Fred C. Goldsmith,
Inventor

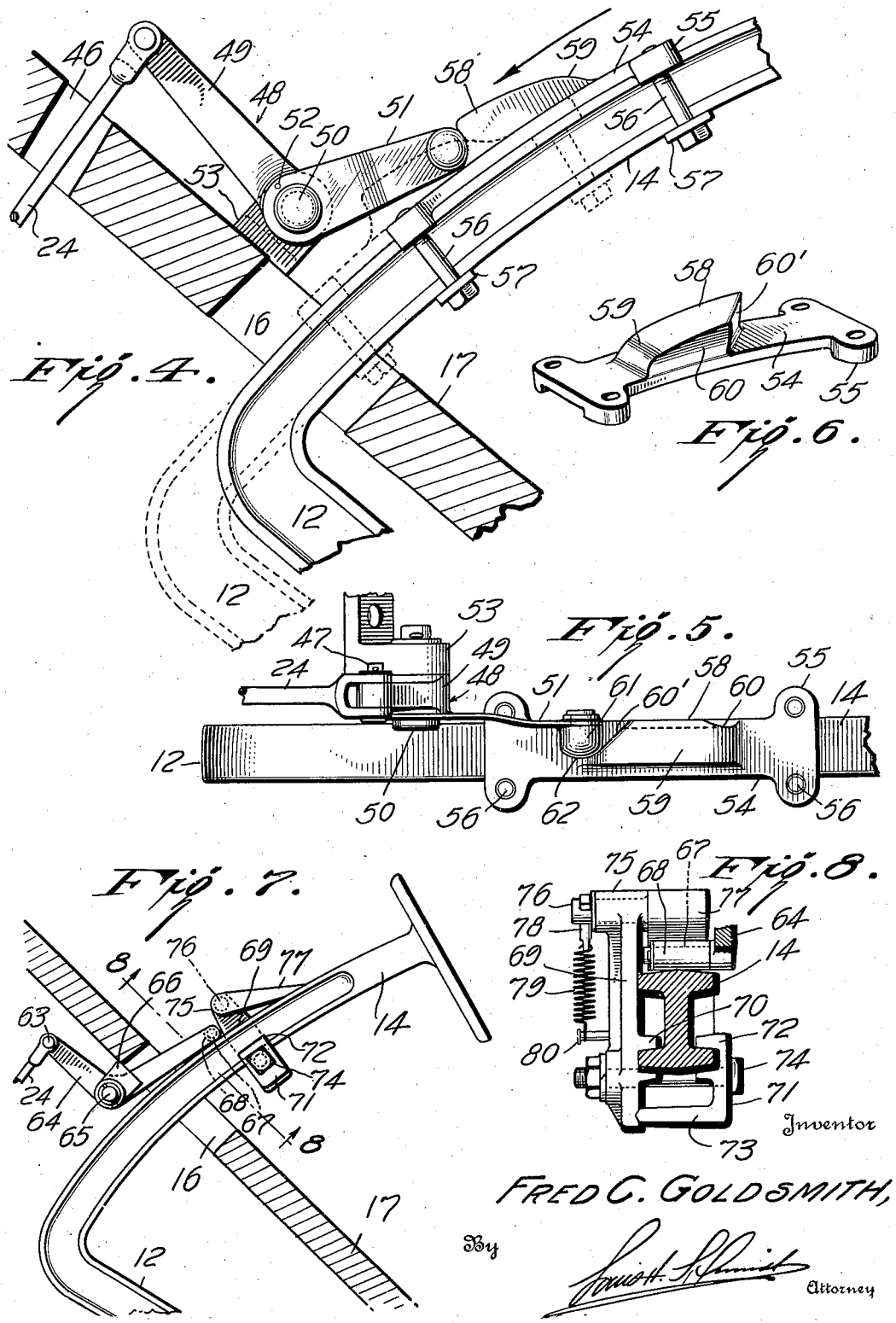

Patented Mar. 4, 1930

1,749,027

UNITED STATES PATENT OFFICE

FRED C. GOLDSMITH, OF HOUSTON, TEXAS

ATTACHMENT FOR MOTOR VEHICLES

Application filed May 10, 1928. Serial No. 276,787.

This invention relates to attachments for motor vehicles, and more particularly to means operated by the clutch pedal upon movement thereof to operative position for opening the throttle of the carbureter.

In shifting the gears of a motor vehicle, it is necessary for the operator to depress the clutch pedal, operate the gear shift lever, and allow the clutch pedal to return to normal or operative position simultaneously with the depression of the accelerator pedal to progressively open the throttle of the carbureter as the clutch becomes engaged. Thus both of the operator's feet are engaged during the gear shifting actions referred to. It has been found that under some conditions, such as when a vehicle is started from a standstill on an incline, it is necessary for the operator to hold depressed both the clutch and service brake pedals, and then to quickly remove his right foot from the service brake pedal to operate the accelerator while the clutch is being released to operative position. Unless this operation is quickly and accurately completed, the vehicle will start to roll rearwardly down the incline. Thus under the circumstances described, and under other conditions, the present steps involved in the operation of a motor vehicle may be dangerous to a material extent.

An important object of the present invention is to provide means for increasing the flow of combustible mixture to the vehicle engine as the clutch pedal is released, to eliminate the necessity for the releasing of the service brake, whereby the movements of the vehicle are maintained under perfect control by the operator.

A further object is to provide novel mechanical connections between the clutch pedal and the carbureter throttle for opening the latter as the clutch becomes engaged.

A further object is to provide means associated with the clutch pedal and the throttle of the carbureter and operative only during movement of the clutch pedal toward operative position for progressively opening the throttle.

A further object is to provide novel mechanical means connected to the carbureter throttle and having a movable element adapted to be engaged by means carried by the clutch pedal, the device being inoperative during movement of the clutch pedal toward inoperative position, and operative upon return movement of the clutch pedal for opening the throttle of the carbureter.

A further object is to provide operating means associated with the throttle of a carbureter and including a pivoted member adapted to swing in one direction upon movement of the clutch pedal to operative position and adapted to remain stationary while the clutch pedal is being depressed to inoperative position.

A further object is to provide a device of the character referred to at least one element of which is adjustable to permit the opening of the carbureter throttle to take place at the proper time with respect to the movement of the clutch.

A further object is to provide mechanical means for opening the throttle of a carbureter, and novel cam means associated with the clutch pedal for actuating the mechanical means to open the carburetor only upon movement of the clutch pedal toward engaged position.

Other objects and advantages of the invention will become apparent from the course of the following description.

In the drawings I have shown several embodiments of the invention. In this showing, Figure 1 is a side elevation of a portion of the power plant of a motor vehicle, parts being shown in section, Figure 2 is an enlarged fragmentary side elevation of a portion of the clutch pedal and operating elements associated therewith, parts being shown in section, Figure 3 is a section taken substantially on line 3—3 of Figure 2, Figure 4 is a view similar to Figure 2 showing a modified form of the device, Figure 5 is a plan view of the same, Figure 6 is a detail perspective view of the cam illustrated in Figures 4 and 5, Figure 7 is a view similar to Figure 2 showing a further modified form of the device, and, Figure 8 is a section on line 8—8 of Figure 7.

Referring to Figures 1 to 3 inclusive, the numeral 10 designates the engine of a motor vehicle including the usual clutch and gear set housing 11, the clutch being operable by the usual pedal 12 mounted upon a shaft 13. The clutch pedal is provided with the usual extension 14 arranged concentric to the axis of the shaft 13 and provided at its extremity with a tread plate 15. The concentric portion of the clutch pedal operates through an opening 16 formed in the floor boards 17.

The engine is provided with the usual intake manifold 18 to which is connected a carbureter 19, the flow of the combustible mixture to the engine being controlled by a throttle 20 mounted upon a shaft 21. An arm 22 is connected to the shaft 21 and is movable to effect the opening and closing of the throttle. A connecting member 23 is associated with the arm 22 for operating the latter, and is connected to the foot accelerator in the usual manner. Spring means of any desired character is associated with the throttle or the elements associated therewith whereby the throttle has a normal bias to closed position.

The device forming the subject matter of the present invention includes a rod 24 formed of a pair of sections preferably connected by a turn buckle 25 to permit the rod to be shortened, or elongated, as will be obvious. The lower end of the rod 24 is pivotally connected to the arm 22 as clearly indicated in Figure 1. The upper end of the rod 24 is pivotally connected as at 26 to a lever 27. A bracket 28 is secured to the floor boards and includes a pair of arms 29 (see Figure 3) connected by a yoke or cross piece 30. The lever 27 is pivotally connected between the ends of the arms 29 by a suitable pivot pin 31. It will be apparent that the lower end of the lever 27 is movable in one direction to open the throttle 20, while movement of the lever in the opposite direction is limited by the yoke 30.

A finger 32 is pivotally connected to the lower end of the lever 27 as at 33. As shown in Figure 3, the lower end of the lever 27 is provided to form a pair of arms 34 between which the finger 32 is arranged, and upwardly of the pivot pin 33, the arms 34 are connected by a web 35.

A rod 36 is pivotally connected as at 37 to the finger 32 above the pin 33, and extends through an opening 38 formed in the web 35. A nut 39 is arranged on the outer end of the rod 36, and a spring 40 surrounds the rod between the nut 39 and the web 35. It will be apparent that the spring 40 normally holds the finger 32 in the position shown in Figure 1, the upper end of the finger contacting with the web 35 to limit the movement of the finger.

A cam indicated as a whole by the numeral 41 is arranged against the upper face of the concentric portion 14 of the clutch pedal as clearly shown in Figures 2 and 3. This cam is provided on opposite sides with projections 42 extending beyond the clutch pedal and provided with openings to receive the arms of U-bolts 43 provided with nuts 44. It will be apparent that these nuts may be loosened to adjust the cam along the clutch pedal to permit the cam to be arranged in the proper position. The upper face of the cam is provided with a curved cam surface 45 adapted to engage the lower end of the finger 32 under certain conditions.

In the form of the device shown in Figures 4 to 6 inclusive, the upper end of the rod 24 extends through an opening 46 for pivotal connection as at 47 with a bell-crank lever indicated as a whole by the numeral 48. This lever includes a rigid arm 49 to which the rod 24 is connected, a shaft 50, and a resilient arm 51, the latter being shown secured to the hub of the arm 49 by a pin 52. Any suitable means however may be employed for securing the arms 49 and 51 together. The shaft 50 is journaled in a bracket 53 secured to the upper face of the floor boards.

Means is provided for effecting upward movement of the arm 51 upon return movement of the clutch pedal in engaging position. A cam plate 54 is arranged on the upper face of the concentric portion of the clutch pedal and is provided with apertured ears 55 adapted to receive bolts 56 which pass through plates 57 arranged beneath the clutch pedal. A cam projection 58 is preferably formed integral with the plate 54 and is provided with a cam surface 59, one side of the projection 58 being provided with an arcuate groove 60. One end of the cam is beveled as at 60' for a purpose to be described. The cam surface 59 is adapted to coact with any suitable element carried by the resilient arm 51 to effect upward movement thereof. In the present instance, this element is shown in the form of a roller 61 having a curved outer face 62 adapted to slide along the groove 60 under certain conditions. It will be apparent that an element secured to the arm 51 may be employed in place of the roller 61, if desired.

In the form of the invention shown in Figures 7 and 8, the upper end of the rod 24 is pivotally connected as at 63 to one end of a bell-crank lever 64, pivotally connected intermediate its ends as at 65 to a bracket 66. The other end of the bell-crank lever extends through the opening 16 through which the clutch pedal projects. The inner end of the bell-crank lever is provided with a projecting pin 67 upon which is journaled a roller 68 wholly offset laterally with respect to the adjacent arm of the bell-crank lever.

An upstanding arm 69 is arranged against one side of the clutch pedal as shown in Figures 7 and 8. This arm is provided at its lower end with a groove projection 70 receiving one of the lower flanges of the clutch pedal, while a coacting clamp member 71 is similarly provided with a groove projection 72 receiving the other lower flange of the clutch pedal. An extending arm 73 is carried by the clamp member and contacts with the lower extremity of the arm 69. A bolt 74 passes through the clamp member and the lower portion of the arm 69 to secure the latter to the clutch pedal.

A boss 75 is formed integral with the upper end of the arm 69 and rotatably receives a shaft 76 to one end of which is secured a finger 77. The opposite end of the shaft 76 is provided with an extending pin 78 connected at its end to one end of a spring 79. The opposite end of this spring is connected to a pin 80 carried by the arm 69, and it will be apparent that the spring 79 normally holds the free end of the finger 77 in engagement with the upper face of the arcuate portion of the clutch pedal.

The operation of the device is as follows:

As will become apparent, it is intended that the clutch pedal be moved to inoperative position without effecting any movement of the throttle, and that the latter be opened to more rapidly supply combustible mixture to the engine as the clutch becomes engaged upon movement of the pedals to operative position. Referring to Figures 1 to 3 inclusive, it will be seen that as the clutch pedal is depressed, the cam surface 45 will engage the lower end of the finger 32. This action tends to swing the lower end of the lever 27 outwardly away from the floor board, which action is prevented by the yoke 30. Continued movement of the clutch pedal causes the finger 32 to swing about its pivot 33 against the tension of the spring 40. Thus the lower end of the finger will ride upon the cam surface, as indicated in Figure 2, until it reaches the upper end of the cam surface, whereupon the spring 40 snaps the finger 32 back to the normal position shown in Figure 1. It will be apparent that during this movement the lever 27 and its associated connections with the throttle will be unaffected. While the clutch pedal is depressed, the gear shift lever is operated in the desired manner whereupon the clutch pedal is released to move toward operative position in the usual manner. The upper end of the cam block then engages the finger 32 to swing the lever 27 in a counter-clockwise direction as viwed in Figure 2, swinging movement of the finger with respect to the lever being limited by its contact with the web 35. Thus the throttle will be progressively opened as the clutch pedal is released, and it is wholly unnecessary for the operator to release his right foot from the service brake pedal.

It will be apparent that it is desirable that the automatic operation of the clutch pedal take place just prior to the engagement of the clutch, which action varies with different clutches. With the present construction, it will be apparent that the cam block may be adjusted along the arcuate portion of the clutch pedal merely by loosening the nuts 44, and thus the cam block may be arranged in the proper position to properly synchronize the action of the throttle with that of the clutch.

The operation of the form of the invention shown in Figures 4 to 6 inclusive is similar to that previously described. Instead of the pivoted finger 32, the laterally flexible arm 51 is employed. As the clutch pedal is depressed, the beveled face 60' will engage the roller 61, thus laterally flexing the arm 51 without effecting upward movement thereof. The rounded end of the roller 61 travels through the groove 60 until the end thereof is reached, whereupon the arm 51 snaps back to normal position. Upon return movement of the clutch pedal, the roller will slide upwardly over the cam face 59, thus swinging the arm 51 upwardly and the rigid arm 49 rearwardly to open the carbureter. Thus it will be seen that the operation of this form of the device is essentially the same as in the form of the device previously described, depression of the clutch pedal being permitted without affecting the throttle, while the latter is opened upon return movement of the clutch pedal toward engaging position.

In the form of the invention shown in Figures 7 and 8, depression of the pedal causes the finger 77 to ride over the roller 68, thus transmitting no movement to the bell-crank lever 64. The finger 77 drops over the roller 68, whereupon the roller is caused to travel upwardly along the finger 77 to open the throttle as the clutch pedal returns to normal position. The spring 79 tends to hold the finger 77 in normal position as will be obvious.

From the foregoing it will be apparent that the present invention provides means whereby the operator of a motor vehicle may accelerate the engine automatically merely by releasing the clutch pedal at each shifting of the gears without having to remove his right foot from the service brake pedal. When the clutch pedal is in normal position, the various cam elements connected to the clutch pedal will be wholly disengaged from the throttle connections, and thus the foot accelerator may be employed in the usual manner. In other words, the present device is operative only during movement of the clutch pedal, and does not otherwise affect the usual operation of the vehicle.

It is to be understood that the forms of the invention herewith shown and described are to be taken as preferred examples of the same and that various changes in the shape, size, and arrangement of parts may be resorted to without departing from the spirit of the invention or the scope of the subjoined claims.

I claim:—

1. The combination with the clutch pedal of a motor vehicle including a carbureter and a throttle therefor, of means operable as the clutch pedal approaches engaging position for opening said throttle, and means for rendering said first named means ineffective as the clutch pedal moves toward inoperative position.

2. The combination with a motor vehicle including a clutch pedal and a carbureter provided with a throttle having a normal bias to closed position, of a member operatively connected to the throttle, a member connected to the clutch pedal and adapted to engage said first named member upon movement of the clutch pedal toward operative position for opening the throttle, and means for rendering contact between said members ineffective for actuating said first named member upon movement of the clutch pedal toward inoperative position.

3. A device of the character described comprising a pair of associated operating members one connected to the clutch pedal of a motor vehicle and the other to the throttle of the carbureter thereof, said members being adapted to engage each other upon movement of the clutch pedal in either direction and being effective for opening the throttle as the clutch pedal approaches operative position, and means for rendering contact between said members ineffective for moving the throttle as the clutch pedal moves toward inoperative position.

4. A device of the character described comprising a member connected to the clutch pedal of a motor vehicle, a second member connected to the throttle of the carbureter, said members being adapted to be brought into contacting relationship upon movement of the clutch pedal in either direction and being effective for opening the throttle as the clutch pedal approaches operative position, and means associated with one of said members for rendering contact therebetween ineffective for moving the throttle as the clutch pedal moves toward inoperative position.

5. A device of the character described comprising a member connected to the clutch pedal of a motor vehicle, operating means connected to the throttle of the carbureter, an element carried by said operating means and arranged in the path of travel of said element, and means for permitting free movement of said element, with respect to said operating means upon movement of the clutch pedal to inoperative position and for moving said operating means therewith upon movement of the clutch pedal to operative position.

6. A device of the character described comprising a member connected to the clutch pedal of a motor vehicle, means operatively connected to the throttle of the carburter and including an element arranged in the path of travel of said member, and means for rendering contact between said member and said element ineffective for operating the throttle as the clutch pedal moves toward inoperative position.

7. A device of the character described comprising a cam carried by the clutch pedal of a motor vehicle, means operatively connected to the throttle of the carbureter and including an element arranged in the path of travel of said cam, and means operative by said cam for rendering contact between said cam and said element ineffective for operating the throttle as the clutch pedal moves toward inoperative position.

8. A device of the character described comprising a member connected to the clutch pedal of a motor vehicle, lever means operatively connected to the throttle of the carbureter of the vehicle and having a portion arranged in the path of travel of said member, and means associated with said lever means for rendering contact between said member and said portion of said lever means for rendering the latter ineffective for operating the throttle as the clutch pedal moves toward inoperative position.

9. A device of the character described comprising a member connected to the clutch pedal of a motor vehicle, a lever operatively connected to the throttle of the carbureter of the vehicle and having a member pivotally connected therewith to swing in one direction with respect thereto, said member having a portion arranged in the path of travel of said first named member to be moved thereby to operate said lever as the clutch pedal moves toward operative position, and resilient means opposing movement of said pivoted member as the clutch pedal moves toward inoperative position.

10. A device of the character described comprising a member carried by the clutch pedal of a motor vehicle and provided with a cam face, a lever pivotally supported adjacent the clutch pedal and operatively connected to the throttle of the carbureter of the vehicle, and a finger pivotally connected to said lever and having a portion arranged in the path of travel of said member, said finger being adapted to swing with respect to said lever upon contact with said cam face as the clutch pedal moves toward inoperative position and being adapted to effect movement of said lever upon movement of the clutch pedal toward operative position.

11. A device constructed in accordance with claim 10 wherein a portion of said finger is adapted to contact with said lever to prevent swinging movement of said finger with respect to said lever upon movement of the clutch pedal toward operative position, and resilient means tending to oppose swinging movement of said finger as the clutch pedal moves toward inoperative position.

12. A device constructed in accordance with claim 10 provided with a bracket pivotally supporting said lever to permit the latter to swing freely in one direction to open the throttle, and a stop member carried by said bracket and adapted to engage said lever to limit the turning movement thereof in the opposite direction.

13. A device of the character described comprising a pair of associated operating members one connected to the clutch pedal of a motor vehicle and the other to the throttle of the carbureter thereof, said members being adapted to coact to effect opening movement of the throttle as the clutch pedal approaches operative position and being ineffective for causing movement of the throttle upon movement of the clutch pedal toward inoperative position, said members being wholly disengaged when the clutch pedal is in operative position.

14. The combination with a motor vehicle including a clutch pedal and a carbureter provided with a throttle having a normal bias to closed position, of a member operatively connected to the throttle, a member connected to the clutch pedal and adapted to engage said first named member upon movement of the clutch pedal toward operative position for opening the throttle, and means for rendering contact between said members ineffective for actuating said first named member upon movement of the clutch pedal toward inoperative position, the member carried by the clutch pedal being movable to a position beyond and wholly disengaged from the other member when the clutch is in operative position.

15. A device of the character described comprising a cam carried by the clutch pedal of a motor vehicle, means operatively connected to the throttle of the carbureter and including an element arranged in the path of travel of said cam, and means operative by said cam for rendering contact between said cam and said element ineffective for operating the throttle as the clutch pedal moves toward inoperative position, said cam being movable to a position beyond and wholly disengaged from said element when the clutch is in operative position.

16. A device of the character described comprising a cam carried by the clutch pedal of a motor vehicle, means operatively connected to the throttle of the carbureter and including an element arranged in the path of travel of said cam, and means operative by said cam for rendering contact between said cam and said element ineffective for operating the throttle as the clutch pedal moves toward inoperative position, said cam being automatically and completely releasable from said element as the clutch moves toward operative position and passes the point of complete engagement of the clutch.

17. A device of the character described comprising a pair of associated operating members one connected to the clutch pedal of a motor vehicle and the other to the throttle of the carbureter thereof, said members being adapted to engage each other upon movement of the clutch pedal in either direction and being effective for opening the throttle as the clutch pedal approaches operative position, and means for rendering contact between said members ineffective for moving the throttle as the clutch pedal moves toward inoperative position, said operating members being automatically and completely releasable from each other as the clutch moves toward operative position and passes the point of complete engagement.

In testimony whereof I affix my signature.

FRED C. GOLDSMITH.